US010852946B1

(12) United States Patent
Ozmen et al.

(10) Patent No.: US 10,852,946 B1
(45) Date of Patent: Dec. 1, 2020

(54) NON-DISRUPTIVE UPGRADE OF STORAGE APPLIANCE NODES USING HOST INITIATOR LOGIN INFORMATION TO AVOID DATA UNAVAILABILITY

(71) Applicant: EMC IP Holding Company LLC, Hopkinton, MA (US)

(72) Inventors: Oguzhan Ozmen, Mississauga (CA); Rakesh Kumar Thakur, Bangalore (IN); Deepak Prakash Ghivari, Bangalore (IN); Ashwini Joshi, Pune (IN); Sneha Yadav, Uttarpradesh (IN); Usha Narasappa, Bangalore (IN); Koundinya Koorapati, Bangalore (IN); Shailesh Jain, Kanpur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 15/884,640

(22) Filed: Jan. 31, 2018

(51) Int. Cl.
*G06F 3/06* (2006.01)
*G06F 8/656* (2018.01)
(Continued)

(52) U.S. Cl.
CPC ............ *G06F 3/0607* (2013.01); *G06F 3/065* (2013.01); *G06F 3/0634* (2013.01);
(Continued)

(58) Field of Classification Search
CPC .... G06F 8/65; G06F 3/067; G06F 2009/4557; G06F 3/0617; G06F 3/0647; G06F 8/656;
(Continued)

(56) References Cited

U.S. PATENT DOCUMENTS

2009/0319699 A1* 12/2009 Canto ................... G06F 11/004
710/17
2010/0162226 A1* 6/2010 Borissov .................. G06F 8/65
717/173
(Continued)

OTHER PUBLICATIONS

Jen-Wei Hu et al.; Autonomous and malware-proof blockchain-based firmware update platform with efficient batch verification for Internet of Things devices; Elsevier; pp. 238-252; retrieved on Sep. 10, 2020. (Year: 2019).*

(Continued)

*Primary Examiner* — S. Sough
*Assistant Examiner* — Cuong V Luu
(74) *Attorney, Agent, or Firm* — Muirhead and Saturnelli, LLC

(57) ABSTRACT

Techniques for non-disruptive upgrade of a storage appliance may include: restarting a first portion of nodes running a target software version while also running a current software version on a second portion of the nodes, wherein the non-disruptive upgrade is performed to upgrade the nodes of the storage appliance from the current software version to the target software version; performing I/O forwarding where I/Os from the host initiators are serviced using the second portion of the nodes and not serviced using the first portion of the nodes; and determining, in accordance with host initiator login information, whether to continue with the non-disruptive upgrade of the nodes to the target software version. Such techniques may be used, for example, to avoid data unavailability for one or more hosts using the host initiator login information.

18 Claims, 9 Drawing Sheets

(51) Int. Cl.
  *G06F 13/12* (2006.01)
  *G06F 16/23* (2019.01)
  *G06F 9/4401* (2018.01)

(52) U.S. Cl.
  CPC .......... *G06F 3/0665* (2013.01); *G06F 3/0689* (2013.01); *G06F 8/656* (2018.02); *G06F 13/126* (2013.01); *G06F 16/2365* (2019.01); *G06F 9/4406* (2013.01)

(58) Field of Classification Search
  CPC ............. G06F 11/1092; G06F 11/2094; G06F 17/30365; G06F 21/31; G06F 3/0607; G06F 16/2365; G06F 3/0634; G06F 3/065; G06F 3/0665; G06F 3/0689; G06F 13/126; G06F 9/4406
  See application file for complete search history.

(56) References Cited

U.S. PATENT DOCUMENTS

2010/0199272 A1* 8/2010 Mahajan ............. G06F 11/2023
                                                    717/171
2013/0205128 A1* 8/2013 Thompson ................ G06F 8/65
                                                    713/2

OTHER PUBLICATIONS

Antti Kolehmainen et al.; Secure Firmware Updates for IoT A Survey; IEEE; pp. 112-117; retrieved on Sep. 10, 2020. (Year: 2018).*
VPLEX GeoSynchrony Version 6.0 Service Pack 1 Patch 4 (revision 5) software product release and release notes, Aug. 2017.

* cited by examiner

| Argument 502 | Description 504 | Prompts and actions 506 |
|---|---|---|
| Always=full control 412 | After an initial wait period of 6 minutes, the status of host initiator logins is checked and the details are displayed. You are prompted with the options at this point. You can continue to type Refresh as needed, before the I/O forwarding phase times out.<br><br>Choose this option if you have hosts that require manual scanning for the paths to be visible. Assistance from the customer is required to verify that initiator paths on the hosts are alive. If the path is unavailable, resolve the issue within the timeout period that you have specified. | Continue: NDU continues even when there are missing initiator logins. Make sure that the customer is aware that missing logins can cause DU.<br><br>Rollback: NDU rolls back and DU is avoided. The customer can check the host, resolve the issue that led to the missing initiator logins, and rerun the NDU.<br><br>Refresh: Get the new list of initiators. If all the initiators are logged in, processing displays the prompts/option for selection to proceed. |
| Missing= conditional control 414 | After an initial wait period of 6 minutes, the status of the host initiator logins are checked. If all the initiator logins are detected, the NDU continues automatically (without displaying any prompt). If there are missing host initiator logins, they are displayed, and you are prompted with the options. You can continue to type Refresh as needed, before the I/O forwarding phase timeout expires.<br><br>Assistance from the customer may be required to determine whether any missing initiators are from critical hosts. If paths are unavailable from critical hosts, the customer may resolve the issue before continuing with the NDU. | Continue:- NDU continues even when there are missing initiator logins. Make sure that the customer is aware that missing logins can cause DU.<br><br>Rollback-: NDU rolls back and DU is avoided. The customer can check the host, resolve the issue that led to the missing initiator logins, and rerun the NDU.<br><br>Refresh-: Get the new list of initiators. After all the initiators are logged in, NDU continues without displaying any prompt. |

| Argument 502 | Description 504 | Prompts and actions 506 |
|---|---|---|
| Never=auto/default 416 | No interaction is required. NDU waits for all the initiators to log back in within the specified timeout period. Resolve any issues within this period. If after the timeout period there are missing host initiator logins, NDU is rolled back. | This option does not create any prompt. After an initial wait period of 6 minutes, the host initiator logins are checked. If all initiator logins are detected, the NDU continues automatically (without displaying any prompt). If there are missing initiator logins, they are checked again every 10 seconds automatically, until the I/O forwarding phase times out. At this point, the NDU rolls back automatically (without displaying any prompt). If (within the IOFWD expiration time period) there are no inconsistencies whereby all host initiators have re-logged in, the NDU automatically continues without displaying any prompt. |

NON-DISRUPTIVE UPGRADE OF STORAGE APPLIANCE NODES USING HOST INITIATOR LOGIN INFORMATION TO AVOID DATA UNAVAILABILITY

BACKGROUND

Technical Field

This application generally relates to data storage and, more particularly, to techniques used in connection with avoiding data unavailability for hosts when performing a non-disruptive upgrade such as to nodes of a storage appliance providing virtualized storage.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O (input/output) operations in connection with data requests, such as data read and write operations.

Host processor systems may store and retrieve data using a storage system containing a plurality of host interface units, disk drives (or more generally data storage devices or physical storage devices), and disk or storage device interface units. The host systems access the storage device through a plurality of channels provided therewith. Host systems provide data and access control information through the channels to the storage device and the storage device provides data to the host systems also through the channels. The host systems do not address the physical storage devices directly, but rather, access what appears to the host systems as a plurality of logical disk units. The logical units may or may not correspond to the actual physical devices or drives.

SUMMARY OF THE INVENTION

In accordance with one aspect of the techniques herein is a method of performing a non-disruptive upgrade of a storage appliance comprising: restarting a first portion of nodes of the storage appliance running a target software version while also running a current software version on a second portion of the nodes of the storage appliance, wherein the non-disruptive upgrade is performed to upgrade the nodes of the storage appliance from the current software version to the target software version; performing I/O forwarding so that I/Os from the host initiators are serviced using the second portion of the nodes and not serviced using the first portion of the nodes, wherein said I/O forwarding routes I/Os, which are issued by the host initiators and directed to the first portion of nodes, to the second portion of nodes, and wherein I/Os from the host initiators directed to the second portion of nodes are serviced using the second portion of nodes; and determining, in accordance with host initiator login information, whether to continue with the non-disruptive upgrade of the nodes to the target software version. The determining may be performed while I/O forwarding is performed. The method may also include: recording an initial set of host initiator login information identifying which host initiators are logged into which nodes of the storage appliance prior to performing the non-disruptive upgrade to upgrade the nodes from running a current software version to a target software version; recording a second set of host initiator login information while performing I/O forwarding, said second set of host initiator login information identifying which host initiators have re-logged into which nodes of the first portion; and comparing the initial set and the second set to determine whether there are any inconsistencies between the initial set and the second set. The host initiator login information may include the initial set and the second set, and said comparing may determine that there are no inconsistencies between the initial set and second set if there are no differences between the initial set and the second set. The method may include responsive to determining that there are no inconsistencies between the initial set and second set, said determining determines to continue with the non-disruptive upgrade of the nodes. The method may include responsive to determining, in accordance with host initiator login information, to continue with the non-disruptive upgrade of the nodes to the target software version, performing remaining upgrade processing including: performing an I/O transfer from the second portion of nodes to the first portion of nodes whereby the first portion of nodes running the target software version service host I/Os and the second portion of nodes running the current software version stop servicing host I/Os; restarting the second portion of nodes running the target software version; and subsequent to restarting the second portion of nodes, servicing host I/Os using the first portion of nodes running the target software version and the second portion of the nodes running the target software version. The method may include while said I/O forwarding is in effect, waiting an initial amount of time for the host initiators to re-log into the first portion of nodes; and subsequent to said initial amount of time elapsing, starting an I/O forward timer denoting a timeout period. Determining, in accordance with host initiator login information, whether to continue with the non-disruptive upgrade of the nodes to the target software version may further include determining whether there are any inconsistencies between the initial set and the second set; and determining, in accordance with an automation setting and in accordance with whether there are any detected inconsistencies between the initial set and the second set, whether to automatically continue with the non-disruptive upgrade of the nodes to the target software version. The automation setting may be one of a plurality of settings including: a first setting to always request confirmation to proceed with a first selected action; a second setting that automatically continues with the non-disruptive upgrade if there are no inconsistencies between the initial set and the second set, and otherwise, if there are inconsistencies determined between the initial set and the second set, requests confirmation to proceed with a second selected action; and a third setting that automatically continues with the non-disruptive upgrade if there are no inconsistencies between the initial set and the second set, and otherwise, if there are inconsistencies determined between the initial set and the second set after the timeout period has elapsed, automatically aborting the non-disruptive upgrade and rolling back the nodes to run the current version of the software for servicing I/Os. Each of the first selected action and the second selected action maybe any of an action to continue with the non-disruptive upgrade, rollback the non-disruptive upgrade, and refresh processing to obtain a revised set of host initiator login information for repeated comparison to the initial set to detect any inconsistencies therebetween. Upon determining inconsistencies between the initial set and the second set and wherein the setting is any of the first setting and the second setting, the method may further include displaying a list of host initiator logins that are included in the initial set and missing from the second set, wherein the list denotes the inconsistencies determined between the initial set and the second set. The storage appliance may provide virtualized storage to one or more hosts including the host initiators, wherein the storage appliance may virtualize storage of a plurality of data storage systems. The method may include establishing connectivity between the host initiators of the hosts and the nodes of the appliance wherein the host initiators are configured, prior to performing the non-disruptive upgrade, to issue I/Os over paths to the nodes of the appliance.

In accordance with another aspect of techniques herein is a system comprising: one or more processors; and a memory comprising code stored thereon that, when executed, performs a method of performing a non-disruptive upgrade of a storage appliance comprising: restarting a first portion of nodes of the storage appliance running a target software version while also running a current software version on a second portion of the nodes of the storage appliance, wherein the non-disruptive upgrade is performed to upgrade the nodes of the storage appliance from the current software version to the target software version; performing I/O forwarding so that I/Os from the host initiators are serviced using the second portion of the nodes and not serviced using the first portion of the nodes, wherein said I/O forwarding routes I/Os, which are issued by the host initiators and directed to the first portion of nodes, to the second portion of nodes, and wherein I/Os from the host initiators directed to the second portion of nodes are serviced using the second portion of nodes; and determining, in accordance with host initiator login information, whether to continue with the non-disruptive upgrade of the nodes to the target software version.

In accordance with another aspect of techniques herein is a computer readable medium comprising code stored thereon that, when executed, performs a method of a non-disruptive upgrade of a storage appliance comprising: restarting a first portion of nodes of the storage appliance running a target software version while also running a current software version on a second portion of the nodes of the storage appliance, wherein the non-disruptive upgrade is performed to upgrade the nodes of the storage appliance from the current software version to the target software version; performing I/O forwarding so that I/Os from the host initiators are serviced using the second portion of the nodes and not serviced using the first portion of the nodes, wherein said I/O forwarding routes I/Os, which are issued by the host initiators and directed to the first portion of nodes, to the second portion of nodes, and wherein I/Os from the host initiators directed to the second portion of nodes are serviced using the second portion of nodes; and determining, in accordance with host initiator login information, whether to continue with the non-disruptive upgrade of the nodes to the target software version. The determining may be performed while I/O forwarding is performed. The method may include recording an initial set of host initiator login information identifying which host initiators are logged into which nodes of the storage appliance prior to performing the non-disruptive upgrade to upgrade the nodes from running a current software version to a target software version; recording a second set of host initiator login information while performing I/O forwarding, said second set of host initiator login information identifying which host initiators have re-logged into which nodes of the first portion; and comparing the initial set and the second set to determine whether there are any inconsistencies between the initial set and the second set. The host initiator login information may include the initial set and the second set, and said comparing may determine that there are no inconsistencies between the initial set and second set if there are no differences between the initial set and the second set. The method may include responsive to determining that there are no inconsistencies between the initial set and second set, said determining determines to continue with the non-disruptive upgrade of the nodes. The method may include responsive to determining, in accordance with host initiator login information, to continue with the non-disruptive upgrade of the nodes to the target software version, performing remaining upgrade processing including: performing an I/O transfer from the second portion of nodes to the first portion of nodes whereby the first portion of nodes running the target software version service host I/Os and the second portion of nodes running the current software version stop servicing host I/Os; restarting the second portion of nodes running the target software version; and subsequent to restarting the second portion of nodes, servicing host I/Os using the first portion of nodes running the target software version and the second portion of the nodes running the target software version.

BRIEF DESCRIPTION OF THE DRAWINGS

Features and advantages of the present invention will become more apparent from the following detailed description of exemplary embodiments thereof taken in conjunction with the accompanying drawings in which:

FIGS. 7, 8 and 9 are examples illustrating different options and levels of automation that may be performed in an embodiment in accordance with techniques herein.

DETAILED DESCRIPTION OF EMBODIMENT(S)

Figure 1:
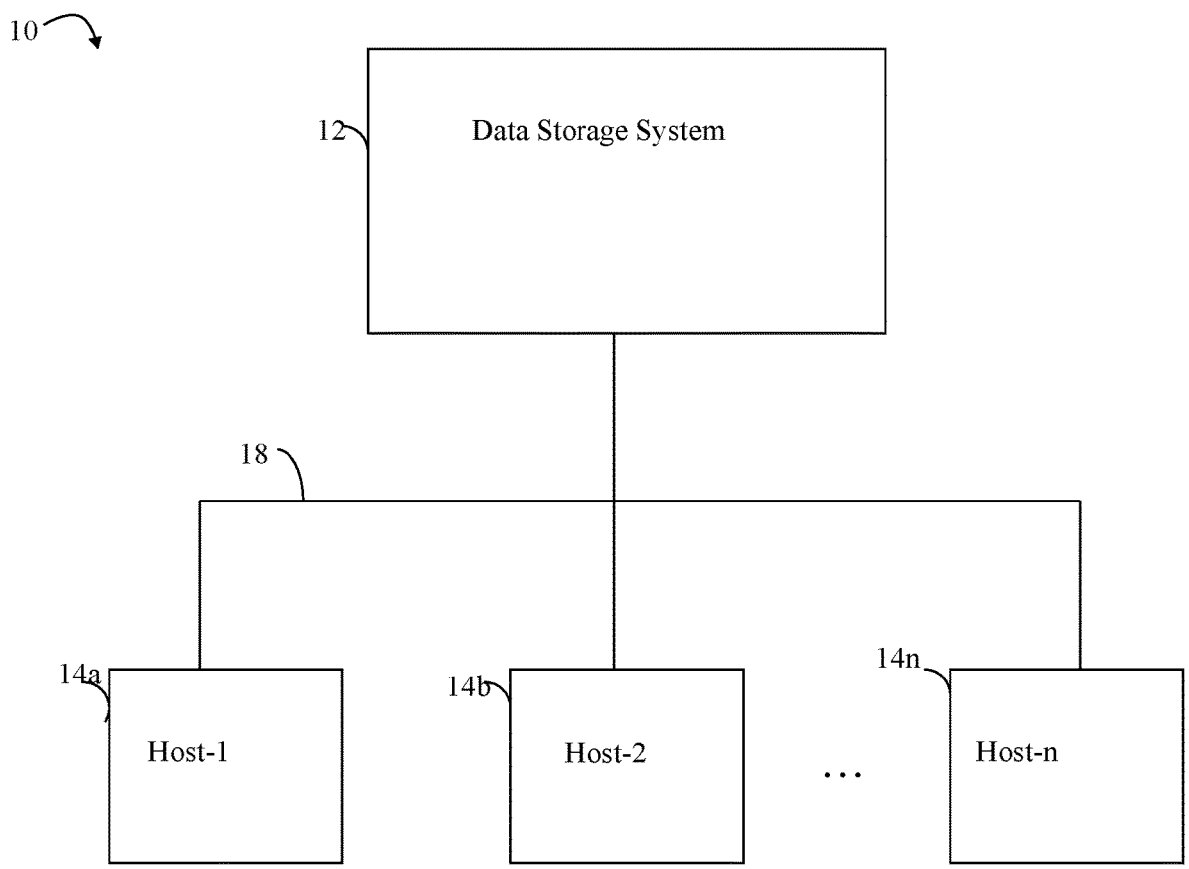
FIG. 1 is an example of components in an embodiment in accordance with techniques herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel (FC), iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2:
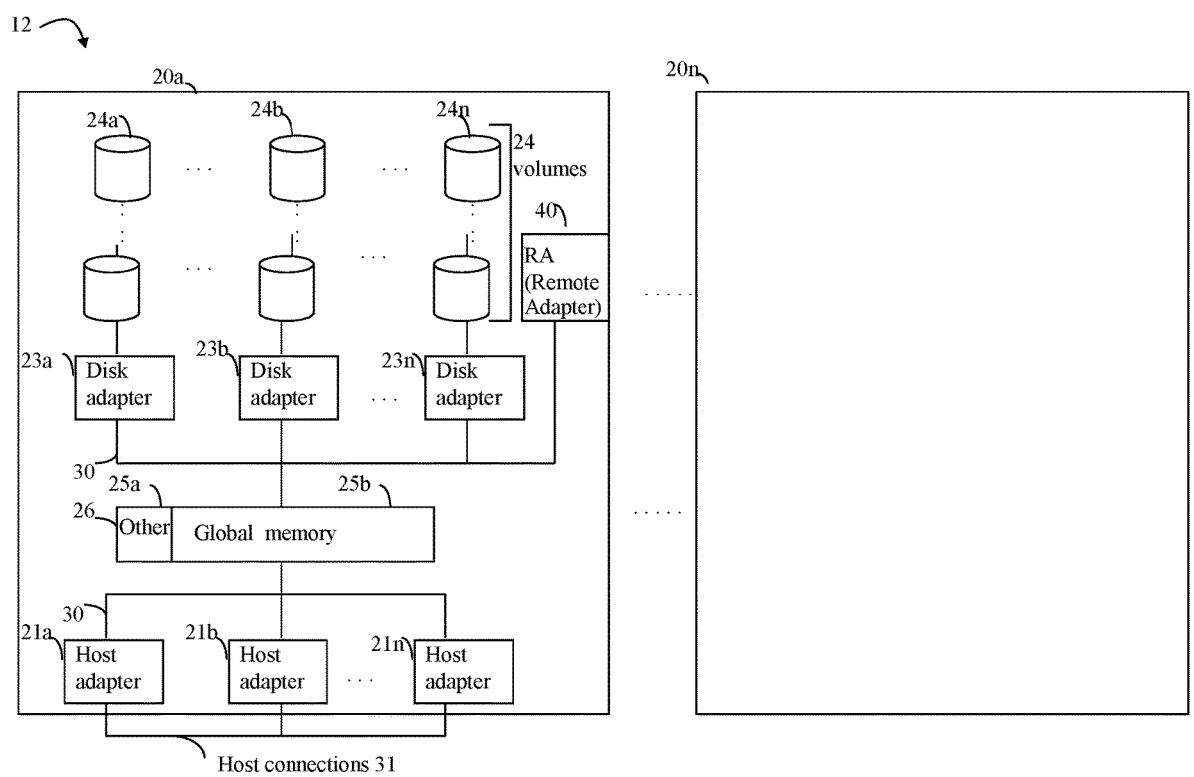
FIG. 2 is an example of an embodiment of a data storage system.

Referring now to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time.

If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
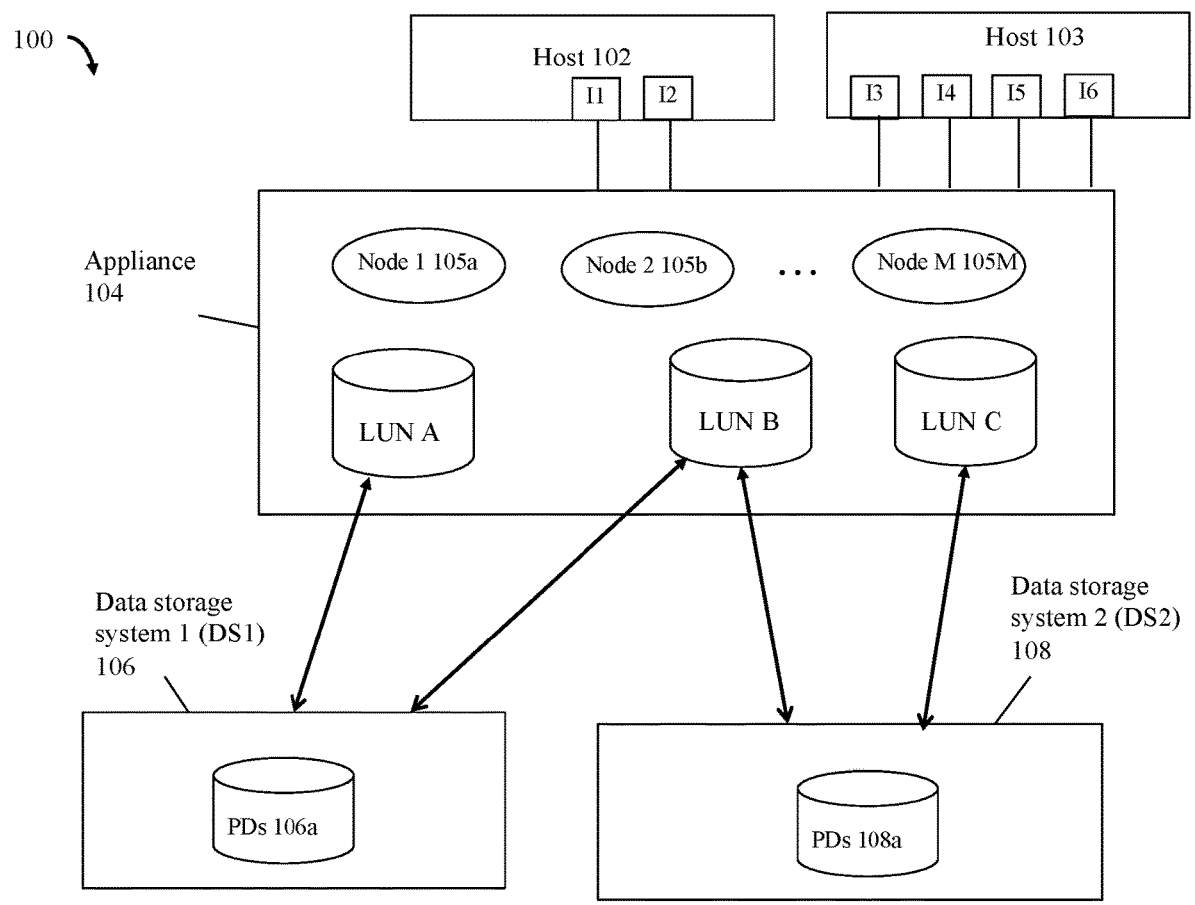
FIG. 3 is an example of a data storage system using an appliance in an embodiment in accordance with techniques herein.

Referring to FIG. 3, shown is another example of another embodiment that may utilize the techniques herein. The example 100 includes hosts 102 and 103, appliance 104, DS1 (data storage system 1) 106 and DS2 (data storage system 2) 108. The appliance 104 may be a data storage virtualization appliance such as a VPLEX™ storage appliance by Dell Inc. which accesses and aggregates storage from multiple data storage systems DS1 and DS2 whereby each such data storage system may be of the same or different types (e.g., same or different manufacturers as well as different array types that may be from a same manufacturer). In at least one embodiment, the appliance 104 is a distributed block-level SAN SCSI storage virtualization appliance. In this manner, the appliance 104 may present storage of DS1 and DS2 in an aggregated virtualized environment to the hosts 102, 103 and other clients. The hosts 102 and 103 communicate with the appliance 104 to access data on any one of the virtualized storage devices LUNs A-C exposed to the client, such as hosts 102 and 103, and each such virtualized storage device of the appliance may have its underlying physical storage provisioned from one or more physical storage devices (PDs) of one or both of the storage systems 106, 108. LUNs A, B and C may be virtualized logical devices or volumes presented by the appliance 104 as logical devices to the hosts 102, 103 where LUN A may have underlying storage provisioned on PDs 106a of DS1 106, LUN B may have underlying storage provisioned from PDs of both data storage systems 106 and 108 (e.g., provisioned from PDs 106a and also PDs 108a), and LUN C may have underlying storage provisioned on PDs 108a of DS2 108.

In the example 100, the systems 106, 108 may both be data storage systems including other components as described above in connection with FIGS. 1 and 2. Each of the hosts 102 and 103 may be, for example, a physical server, a virtual machine (VM) or even a cluster of multiple physical server computer systems or VMs. In at least one embodiment, the appliance 104 may be a distributed block-based virtual storage appliance with multiple nodes. Although only 2 hosts are illustrated in FIG. 3, more generally any suitable number of N hosts, N being greater than 0, may be included in an embodiment in accordance with techniques herein. In at least one embodiment, the appliance 104 may include nodes 105a-M which are distributed multiple independent nodes.

Described in following paragraphs are techniques that may be used to non-disruptively perform an upgrade for a distributed storage virtualization appliance, such as appliance 104 including multiple nodes 105a-M. Each of the nodes 105a-M of the appliance 104 may be a component that is a director including one or more CPUs, memory (e.g., RAM) and the like. In at least one embodiment in accordance with techniques herein, the nodes 105a-M of the appliance 104 may perform processing and function as one or more of the different directors described herein of the data storage system. For example, in at least one embodiment, each of the nodes 105a-M of the appliance may execute code whereby the node performs processing as described herein for multiple different types of directors such as an HA, DA, and the like. The processing performed by the nodes 105a-M may be in connection with servicing I/Os (e.g., reads and writes) from the hosts 102, 103. Each of the nodes 105a-M may execute code such as firmware to perform the processing of the HA, DA, and the like, in connection with servicing the received host I/O operations. In at least one embodiment, each of the hosts 102, 103 may connect to all the nodes 105a-M (e.g., front end ports of the nodes) of the storage appliance. Each of the nodes 105a-M is connected to each of the hosts 102, 103 through a front end port of the node. Additionally, each of the nodes 105a-M is also connected to the backend storage (e.g., storage systems 106, 108) through a backend port of the node.

As such, at various points in time, the firmware, or more generally code or software, installed on the nodes may need to be upgraded from a first installed version currently residing on the nodes 105a-M to a second updated version of code. Described herein are techniques for performing a non-disruptive upgrade (NDU) of software on the nodes 105a-M of the appliance 104. The software upgrade performed by the NDU processing may be non-disruptive from the host's perspective whereby, during the upgrade of software on the nodes 105a-M, the hosts 102, 103 continue to have access to data stored on such virtualized LUNs A-C presented to the hosts using virtualized storage appliance 104 (e.g., hosts have uninterrupted and continuous access to data storage on the virtualized LUNs A-C whereby the hosts may continuously issue I/Os to such LUNs before, during and after the software upgrade to the nodes). In at least one embodiment of techniques herein, the NDU processing may include rollback capabilities for a distributed storage virtualization appliance with a cluster of nodes.

In connection with discussion herein, an I/O may be issued from an initiator port of the host, such as a port of an host bus adapter (HBA) of the host, to a target port of a node of the appliance 104 (e.g., whereby the node at that time performs processing of an HA component that receives I/Os from hosts). Such techniques described in following paragraphs for performing an NDU of nodes of the appliance take into account login information regarding the host initiators, such as ports of the host initiators, to avoid the occurrence of data unavailability for the hosts. As used herein, a host initiator may login to a node whereby the host initiator port logs into a target port of a node to thereby establish a connection or path between the initiator and the target port to access an exposed LUN of the appliance 104. The foregoing and other aspects of techniques herein are set forth in following paragraphs.

In at least one embodiment in accordance with techniques herein, the hosts 102, 103 and appliance 104 are configured in an active/active arrangement whereby each of the hosts 102, 103 performs I/O to the exposed LUNs A, B and C over all paths. More generally, in an embodiment in accordance with techniques herein, each host initiator port may be zoned to at least two nodes of the appliance although, in order to provide full redundancy and high availability, each host initiator port may be zoned to all available nodes of the appliance. Thus, for example, assume that host 102 includes 2 initiators I1 and I2 each having a single port (e.g., HBA port). I1 is connected to each of the M nodes 105a-M (e.g., M paths) and I2 is connected to each of the M nodes 105a-M (e.g., M paths). Each of the LUNs A, B and C may be exposed over both sets of M paths to I1 and I2 whereby host 102 may issue I/Os to LUN A, B and C over any path of the two sets of M paths. In this example, host 103 includes 4 initiators I3-I6 each having a single port (e.g., HBA port). In a similar manner to that as described for I1 and I2 of host 102, each of I3-I6 is connected to each of the M nodes 105a-M (e.g., total of 4 sets of M paths, 1 set of M paths per initiator of host 103). Each of the LUNs A, B and C may be exposed over all 4 sets of M paths to I3-I6 whereby host 103 may issue I/Os to LUNs A, B and C over any path of the 4 sets of M paths.

In at least one existing implementation not in accordance with techniques herein, the upgrade process performed to upgrade software of the nodes of the appliance partitions the nodes into two portions, wherein nodes of a first of the two portions may all be upgraded at a first point in time, and then subsequently, nodes of the second of the two portions may all be upgraded. The first portion of nodes to be upgraded may be referred to as first upgrades and the second portion of nodes to be upgraded may be referred to as second upgrades, whereby the first portion or upgraders are upgraded prior to the second portion or second upgraders. Each of the virtualized block storage volumes or LUNs exposed from the appliance may be accessible through both the sets of upgraders. Host applications may use the virtualized volume or LUN exposed by the appliance using host-based multi-pathing software. Thus at any given point in time, I/Os directed to one of the virtualized LUNs may be received through target ports of both the first and second upgrader sets. During a code upgrade, the first upgraders are upgraded first, and after that, the second upgraders are upgraded next, thereby guaranteeing high availability. One step in the NDU process includes transitioning from use of the old software, such as firmware, on all the nodes to use of the new software, such as new firmware, on all the nodes. However, in some systems, host initiators may not be able to log back into the target ports of the first upgraders in a timely manner when performing such transitioning whereby the host can lose all access paths to a LUN when the second upgraders become unavailable/go offline for the upgrade (and the host initiators have not yet logged into the first upgraders). This causes data unavailability to such a host. Techniques described in following paragraphs avoid such an instance of data unavailability during the NDU of the nodes of the appliance.

As described in more detail below, one feature of techniques herein is that login information regarding which host initiators have logged into the first upgraders is captured before the upgrade, and then after the first upgraders are rebooted with new upgraded code (e.g., firmware). The login information captured prior to the upgrade is used to determine, after the upgrade, whether all the initiators have logged back in or not to the first upgraders. Based on this, in at least one embodiment described herein, the administrator may be given an option to either proceed with the upgrade of second upgraders or rollback the first upgraders to the prior existing software version. In at least one embodiment in accordance with techniques herein, three options may be provided to the administrator:

(i). to wait for a maximum time (e.g., defined prior to the upgrade) for the host initiators to establish a Login with the first upgrader nodes. This is helpful for the administrator to take any corrective action (e.g., like troubleshooting the SAN, fabric, etc). In at least one embodiment, processing may detect any delayed initiator log ins and lets the administrator know of updates regarding additional initiator logins to the first upgraders as such additional initiator logins occur.

(ii). to rollback and abort the upgrade in which case the first upgraders are rolled back to the previous version of the firmware. This option is important when the administrator notices that one or more host initiators have not logged into the first upgraders and wants to rollback to the older version of the firmware, thereby avoiding the data unavailability condition.

(iii). to roll forward/continue with upgrade. This option may be selected, for example, when all host initiators have logged back into the first upgrader nodes. Additionally, it may be that not all host initiators have logged back into the first upgrader nodes whereby the administrator may still select to proceed with the firmware upgrade on the second upgraders despite one or more of the host initiators not logging into the first upgraders. In the latter case, the administrator is aware of the consequences of using this option.

Thus, in at least one embodiment in accordance with techniques herein including the foregoing options, the risk of data becoming unavailable is significantly reduced and the administrator makes a selection of one of the foregoing options while also being informed regarding the status of which host initiators are/are not logged back into the first upgraders. In an embodiment in accordance with techniques herein such as including the foregoing options, the administrator may have further control to avoid data unavailability conditions during an NDU.

In summary, one existing implementation of the NDU process not using techniques herein may include performing:

1) Divide nodes into two portions called the first and second upgraders.
2) Copy the new software (e.g., firmware upgrade) on all the upgraders.
3) Install the software on the first upgraders.
4) Stop the first upgraders. At this point only the second upgraders are serving host I/Os. Note that the second upgraders are still running the old firmware code.
5) Restart first upgraders running new upgraded software version. Second upgraders which are running on the old firmware code continue to serve host I/Os.
6) Also, I/Os from the host initiators which have already logged in to the first upgraders (new version of firmware), are routed to the second upgraders (old version of firmware) via I/O forwarding in order to avoid two different versions of the firmware serving I/Os simultaneously. Thus, at this point the second upgraders are executing the prior older software version and servicing all I/Os (e.g., host I/Os received by the second upgraders directly from the host, and host I/O which are initially received by the first upgraders and then forwarded to the second upgraders for servicing).
7) Perform I/O transfer from second upgraders to first upgraders. At this point the first upgraders which are running the new version of the code will take the responsibility of serving host I/Os and second upgraders will stop serving the host I/Os.
8) Stop the second upgraders. At this point only the first upgraders continue to serve host I/Os
9) Finish the NDU whereby the second upgraders are restarting and now execute the upgraded new code version. After this, both first and second upgraders will be running the same code version and serving host I/Os.

It should be noted that both I/O forwarding and I/O transfer that may be performed in an embodiment in accordance with techniques herein are described in more detail in following paragraphs.

Thus, in the existing NDU process just described above which is not in accordance with techniques herein, after the first upgraders are upgraded with the new firmware, there is no mechanism to confirm if all the host initiators have indeed logged in to the first upgraders or not. If the host initiators have logged in, then paths are available for serving I/Os when the second upgraders are stopped (e.g., become unavailable such as with item 8 above) as part of NDU. If a particular host's initiators have not yet logged back into the first upgraders, and where the NDU processing has already stopped/taken down the second upgraders for code upgrade (e.g., as in item 8 above), it would result in the host losing all paths to the LUN from both first and second upgraders thereby leading to a data unavailability condition.

In contrast to the foregoing existing NDU process just described, an embodiment in accordance with accordance with techniques described herein performs NDU processing that uses the host initiator login information to ensure a highly reliable NDU that minimizes data unavailability conditions.

The foregoing and other aspects of an embodiment in accordance with techniques herein are described in more detail below in following paragraphs.

Figure 4:
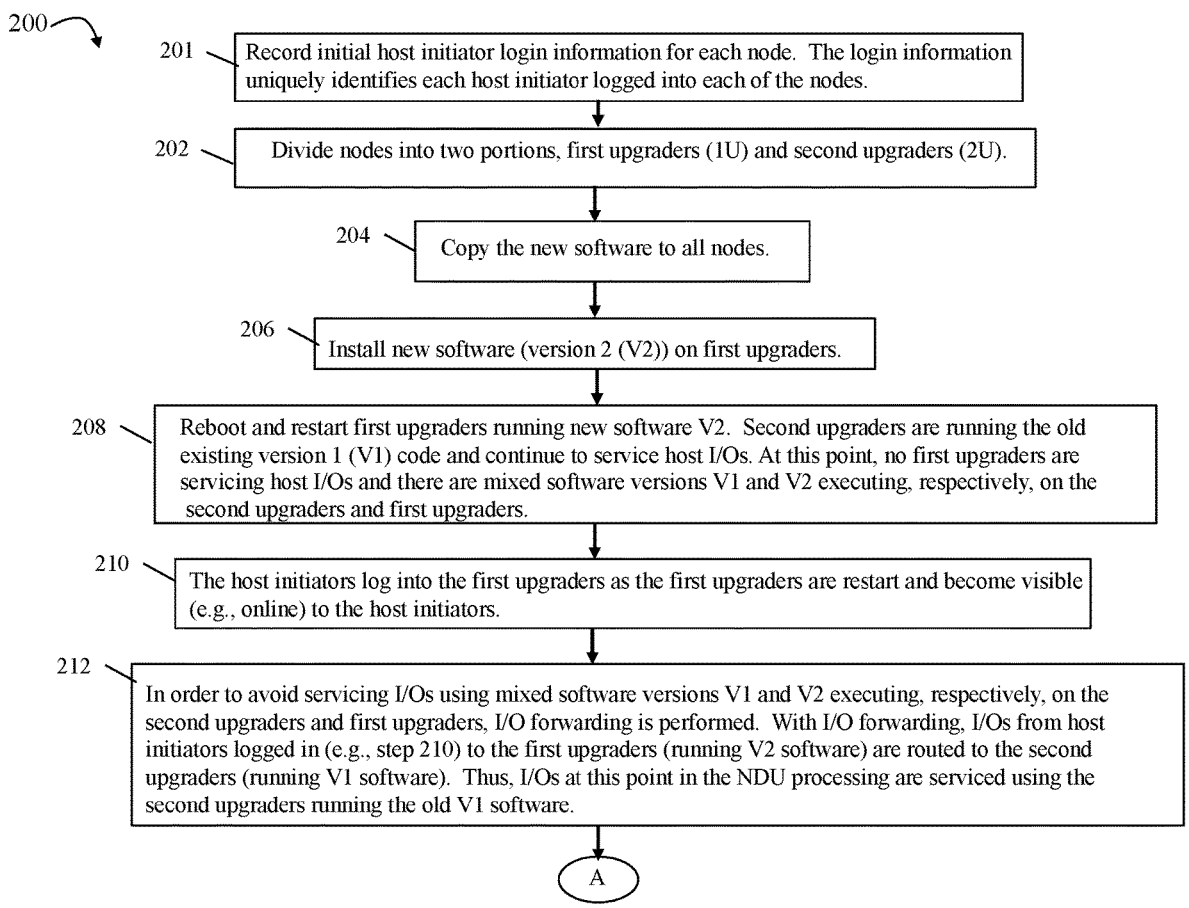
FIGS. 4, 5, and 6 are flowcharts of processing steps that may be performed in an embodiment in accordance with techniques herein.
Figure 5:
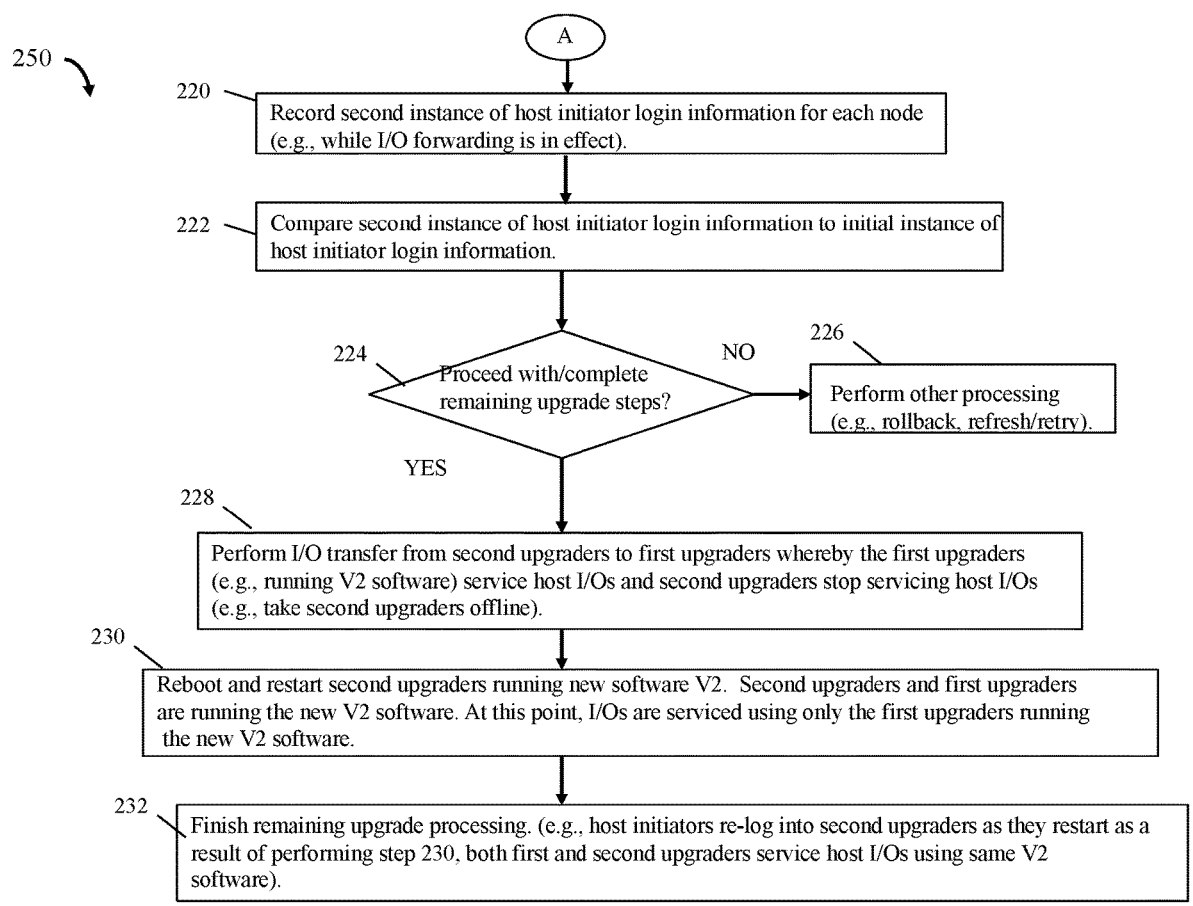

Referring to FIGS. 4 and 5, shown is a flowchart 200, 250 of processing steps that may be performed in at least one embodiment in accordance with techniques herein when performing a NDU on nodes of the storage appliance, such as illustrated and described above in connection with FIG. 3.

At step 201, processing is performed that records initial host initiator login information for each node of the appliance being upgraded. The host initiator login information may uniquely identify each host initiator logged into each of the nodes. In at least one embodiment, each/all of the host initiators I1-I6 have connectivity to each/all of the nodes 105a-M. However, more generally, it is assumed that each such host initiator having connectivity to a node will proceed with logging into the node, whereby each host initiator may or may not have connectivity to each of the nodes of the appliance. For example, consistent with discussion elsewhere herein, it is assumed that each/all of the host initiators I1-I6 have connectivity to each/all of the nodes 105a-M whereby each of the host initiators I1-I6 is logged into each of the nodes 105a-M. For example, the login information recorded in step 201 indicates that each of the initiators I1-I6 are logged into node 105a, each of the initiators I1-I6 are logged into node 105b, and so on, for each of the remaining M nodes of the appliance. In at least one embodiment, the FC protocol may be utilized whereby the host initiators I1-I6 log into the nodes 105a-M over an FC/SCSI connection using FC login information. In such an embodiment, each of the host initiators may have an associated identifier uniquely identifying the host initiator. Generally, each host initiator may have an associated UUID (universally unique identifier) that uniquely identifies each host initiator. In at least one embodiment using FC, the host initiator's unique identifier (ID) may be a worldwide name (WWN) or worldwide port number or name (WWPN) which is a unique identifier for each FC port of any Fibre Channel device. For each host, there may be a WWPN for each host initiator port of the HBA. For purposes of discussion herein, each host initiator may have an associated host initiator ID (HIID) that uniquely identifies each host initiator. Step 201 includes recording, for each of the nodes 105a-M, the set of HIIDs of the host initiators logged into the particular node. Step 201 records the host login information prior to performing the NDU. Although recording the host login information is illustrated in step 201, more generally, step 201 processing may be performed at any point in processing prior to stopping the first upgraders or taking the first upgraders offline whereby the first upgraders are then subsequently rebooted and restarted (e.g., perform step 201 processing prior to step 208 described below).

At step 202, the nodes of the appliance are partitioned into two portions, also referred to herein as first upgraders (1U) and second upgraders (2U). In at least one embodiment where the appliance includes an even number of nodes, step 202 may partition the nodes into equal portions each including the same number of nodes. For illustration and discussion purposes, assume the nodes are currently running old or existing software also referred to as version 1 (V1) software and processing of flowchart 200 is now executed to perform an NDU of the nodes of the appliance to a new version, version 2 (V2), of software. It should be noted that the V2 or new version of software may also be referred to as the target version of the software denoting the targeted version of the upgrade. Following step 202, control proceeds to step 204. At step 204, the new software may be copied or downloaded to all the nodes of the appliance. Following step 204, control proceed to step 206. In step 206, the new V2 software may be installed on the first upgraders. Following step 206, control proceed to step 208. Step 208 may include stopping the first upgraders whereby the first upgraders are taken off line and do not service I/Os from the host. Subsequently, the first upgraders may be rebooted and are restarted using the new V2 software. At this point in time once step 208 has completed, the second upgraders are running the old existing V1 software and continue to service host I/Os. At this point once step 208 has completed, no first upgraders are servicing I/Os, and there are mixed software versions V1 and V2 executing, respectively, on the second upgraders and first upgraders. Following step 208, control proceeds to step 210 where the host initiators log into the restarted/rebooted first upgraders as the first upgraders are restarted and become visible (e.g., online) to the host initiators. From step 210, control proceeds to step 212. At step 212, in order to avoid servicing I/Os using mixed software versions V1 and V2 executing, respectively, on the second upgraders and first upgraders, I/O forwarding is performed. With I/O forwarding, I/Os from host initiators logged in (e.g., via step 210) to the first upgraders (running V2 software) are routed to the second upgraders (running V1 software). Thus, I/Os at this point with I/O forwarding in effect in step 212 in the NDU processing, host I/Os received by the appliance are serviced only using the second upgraders running the old V1 software (e.g., no first upgraders running new V2 software service I/Os).

Consistent with discussion above, existing prior implementations not using techniques herein may proceed with performing an I/O transfer from the second upgraders to the first upgraders. However, alternatively, in at least one embodiment in accordance with techniques herein, processing from step 212 may proceed to 220 where additional processing is performed to determine the current status of the host initiator logins (as performed in step 210). In particular step 220 may include recording a second instance of host initiator login information denoting a snapshot or status of which of the host initiators have re-logged into each of the nodes 105a-M subsequent to restarting the first upgraders with the new V2 software (e.g., status of host initiators logins completed to current processing point in time).

As noted above, from step 212, control proceeds to step 220. In step 220, processing may be performed to record a second instance of host initiator login information for each node while I/O forwarding, as established in step 212, is in effect. Step 220 is similar to step 201 with the second instance of step 220 being at a different subsequent point in time than that associated with step 201. From step 220, control proceeds to step 222. At step 222, the second instance of host initiator login information (from step 222) may be compared to the initial instance of host initiator login information (from step 201). From step 222, control proceeds to step 224 where a determination is made as to whether to proceed with completing or performing the remaining upgrade steps whereby, at the completion, all nodes of the appliance are running the V2 new software and all nodes (e.g., that are functional and online) are available for serving host I/Os.

In at least one embodiment in accordance with techniques herein, processing from step 224 may include proceeding to step 228 if the comparison performed in step 222 indicates that all host initiators have re-logged into the first upgraders (e.g. no difference between initial and second instance of host initiator login information). Otherwise, processing may proceed from step 224 to step 226 where other processing options may be performed. It should be noted that additional detail regarding processing that may be performed in at least one embodiment in connection with steps 222, 224 and 226 are described in more detail in following paragraphs.

It should be noted that if a particular host's initiators have not re-logged back into the nodes prior to the second upgraders being taken offline (e.g., in step 228) then that particular host does not have any established active and working path to nodes of the appliance over which to access exposed LUNs of the appliance. Thus, the particular host experiences a data unavailability condition with respect to its data stored on the exposed LUNs of the appliance. In connection with techniques as described herein, in at least one embodiment, processing of the upgrade may not be allowed to proceed unless and until all host initiators have re-logged into all nodes in order to avoid such data unavailability. As described in more detail below, additional processing may be performed in step 226 to also avoid or further minimize conditions for possible data unavailability depending on the particular options and administrative control in an embodiment.

In at least one embodiment, the determination made at step 224 may be performed in accordance with the comparison of the second instance and initial instance of host initiator login information of step 222. For example, in at least one embodiment, step 222 may indicate that there is no difference between the initial instance and the second instance of host initiator logins on the nodes thereby indicating all host initiators have re-logged into the first upgraders (e.g., step 210) after reboot/restart (e.g., after step 208) (e.g., indicating that all host initiators logged into each of the nodes prior to performing the upgrade (at step 201) have, after performing step 208, re-logged into the same nodes. In this case, processing may proceed to step 228.

The comparison from step 222 may also indicate, for example, that one or more hosts initiators with respect to one or more nodes included in the initial instance of host initiator login information are missing from the second instance whereby such missing host initiators have not yet re-logged into one or more of the first upgraders (e.g., step 210). In this case, processing may proceed to step 226 to perform other processing, such as processing to rollback nodes to V1 software; processing to refresh or retry steps 220, 222, and 224; processing to take additional corrective actions, and the like. It should be noted that there may be one or more reasons why host initiators have not re-logged into one or more first upgraders. For example, it may be that such missing initiators take a longer additional amount of time (e.g., longer than the elapsed time to when the second instance is recorded in step 220) to re-login to one or more of the first upgraders. In such cases, waiting an additional amount of time may result in such host initiators re-logging into any remaining nodes. As another reason, it may be that initiators of a particular host may not log into the nodes automatically and may, for example, require manual intervention such as manual login to such nodes, or confirmation/permission (e.g., by an administrator) to proceed with performing the login to such nodes. In such cases, additional processing may be performed whereby, after such necessary additional processing, the missing host initiators may be re-logged into any remaining nodes. As yet another reason, there may be a connectivity error or difference between host initiators and the appliance nodes that has occurred since step 201 processing. For example, a host initiator may be offline/unavailable, there may be a problem with a connection from one or more hosts/host initiators to the appliance, and the like. In such cases, additional corrective action may be taken. In any event, additional processing, and different options for administrative control may be performed in connection with step 226 depending on the embodiment. Additional details regarding such processing of step 226 and control options that may be taken by an administrator in at least one embodiment are described in more detail elsewhere herein.

At step 228, I/O transfer processing is performed which transfers I/O processing or servicing from the second upgraders to the first upgraders (e.g., running V2 software) whereby the first upgraders service host I/Os and the second upgraders stop servicing host I/Os (e.g., taken offline). From step 228, control proceeds to step 230 where the second upgraders are rebooted and restarted. Thus, in step 230 after the second upgraders restart, they are running the new software V2 whereby both the second upgraders and first upgraders are now running the new V2 software. At this point, I/Os are serviced using only the first upgraders running the new V2 software. Control proceeds from step 230 to step 232. In step 232, remaining upgrade processing may be completed. Step 232 may include, for example, the host initiators re-logging into the second upgraders as they restart and are online/visible to the host initiators. At this point, the restarted second upgraders, in addition to the first upgraders, may service host I/Os using the same V2 software.

In connection with techniques herein, goals may include performing the NDU upgrade on all nodes of the appliance and also prevent the data unavailability condition by making sure all host initiators have re-logged into the rebooted first upgraders before taking the second upgraders offline/not servicing host I/Os (e.g., step 228). After being taken offline, the second upgraders are subsequently (e.g., in step 230) rebooted and restarted to run the new V2 software). In at least one embodiment, another goal of techniques herein may include providing the administrator with options to rollback or continue the upgrade process when inconsistencies about the host initiator logins are detected. For example, the administrator may be presented with options of rollback all nodes to V1 software (e.g., stop and undo the upgrade) or continue with the upgrade (e.g., continue with step 228 processing) when not all host initiators have re-logged into all nodes whereby there are differences or inconsistencies between the initial and second instances of host initiator login information. In at least one embodiment, another goal of techniques herein may include providing the administrator with the option to pause during the upgrade process to take any corrective action. In this manner, the administrator may select to correct any host initiator-appliance connectivity problems before completing the upgrade. Additionally, an embodiment may provide the administrator the control or option to proceed with the upgrade even though inconsistencies about host initiator logins have been detected (e.g., when the initial and second instance of host login information are not the same and thereby indicate that not all host initiators have re-logged into all nodes (e.g., step 210) subsequent to the first upgraders being restarted (e.g., step 208). Processing consistent with these goals as may be performed in at least one embodiment in accordance with techniques herein will now be described with reference to FIG. 6.

Figure 6:
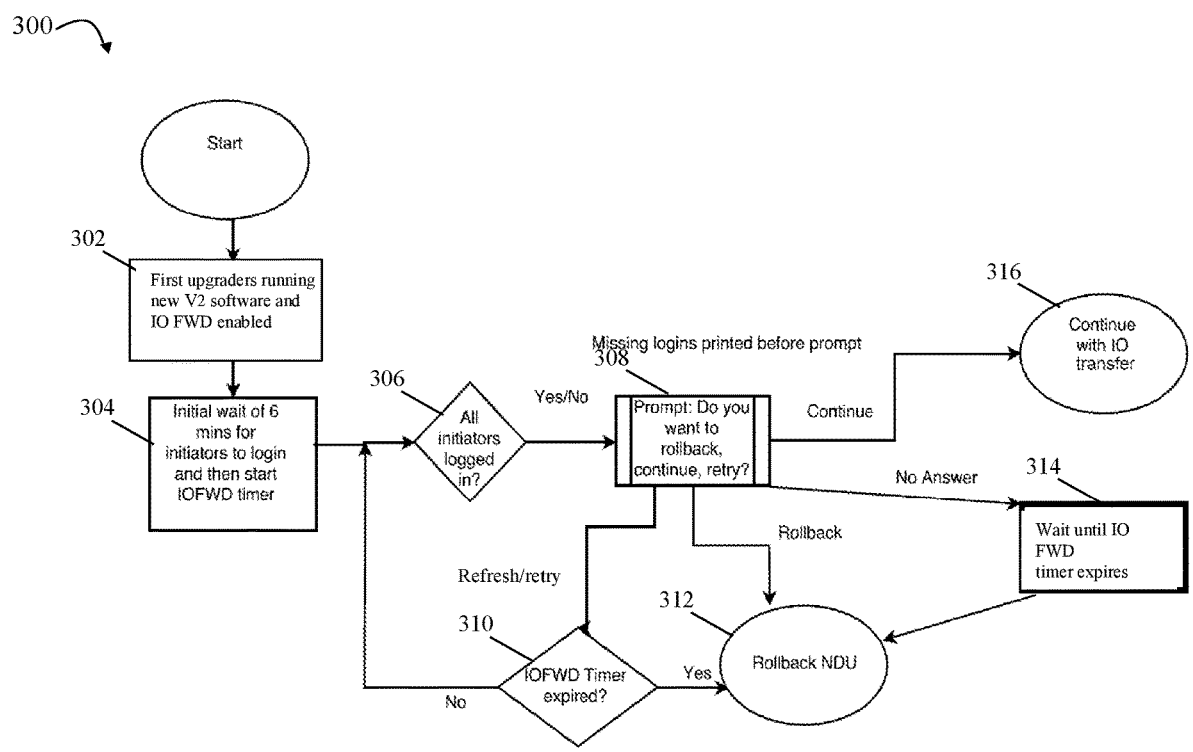

Referring to FIG. 6, shown is another flowchart 300 of processing that may be performed in an embodiment in accordance with techniques herein. FIG. 6 provides additional detail regarding processing steps of FIGS. 4 and 5, and in particular, additional detail regarding steps 222, 224 and 226 that may be performed in an embodiment in accordance with techniques herein. At step 302, the NDU processing is in a state where the first upgraders have been rebooted and restarted running the new V2 software and where I/O forwarding (IOFWD) is in effect so that only the second upgraders running the old V1 software are servicing I/Os. Thus, step 302 denotes that the NDU processing as described in connection with FIGS. 4 and 5 has been performed up to and including step 212. From step 302, control proceeds to step 304. In step 304, processing may include waiting and an amount of time, such as 6 minutes, for the initiators to re-login to the nodes (e.g., wait 6 minutes for host initiator to re-login as in step 210). Step 304 also includes setting an IOFWD timer, which denotes an amount of time I/O forwarding will remain in effect before aborting the upgrade and rolling back nodes to use the previous V1 software. From step 304, control proceeds to step 306 where a determination is made as to whether all host initiators have completed re-logging into the nodes. Step 306 may include, for example, obtaining a current instance of host initiator login information (as described in step 220) and comparing (e.g., as in connection with step 222) the current instance to the initial instance (e.g., as obtained in step 201). Such a comparison may indicate one or more inconsistencies between the current and initial instances (e.g., one or more host initiators has not re-logged into one or more nodes as indicated by differences or inconsistencies between the initial and current instances of host initiator login information), or may otherwise indicate no inconsistencies (e.g., each host initiator as completed re-logging into all the same nodes as the host initiator had been logged into prior to commencing the upgrade). From step 306, control proceeds to step 308 where any/all missing host initiator logins may be communicated to an administrator, such as via a user interface display. Additionally, the administrator may be presented with a prompt and one or more options from which the administrator may select. In at least one embodiment, processing as described in FIG. 6 may be further automated to varying degrees and under particular conditions rather than have the administrator always perform a manual selection.

In step 308, the options presented along with the list of inconsistent or missing host initiator logins may include a rollback option, a retry or refresh option and a continue option. The continue option, if selected, continues with step 316 with the upgrade processing to perform I/O transfer processing (e.g., such as described in step 228). Thus, step 316 continues with processing of steps 228, 230 and 232 as described in FIG. 5.

The rollback option, if selected, continues with step 312 to rollback the upgrade. Step 312 includes aborting the upgrade and rolling back all nodes to the previous V1 software. At this point in processing, the first upgraders are rolled back or restored to running the prior V1 software. The second upgraders are still running the V1 software (e.g., as indicated in step 212) and thus do not require additional processing to restore the second upgraders to running the V1 software.

If the administrator does not make a selection, control proceeds to step 314 where, by default, processing continues to wait until the IOFWD timer expires. If the IOFWD timer expires prior to the administrator making a selection, then processing proceeds from step 314 to step 312 to rollback the upgrade.

The refresh/retry option, if selected, continues with step 310 where a determination is made as to whether the IOFWD timer has expired. If step 310 evaluates to yes, control proceeds to step 312 to rollback the upgrade. If step 310 evaluates to no, control proceeds to step 306 to reassess the current state of host initiator logins.

Figure 7:
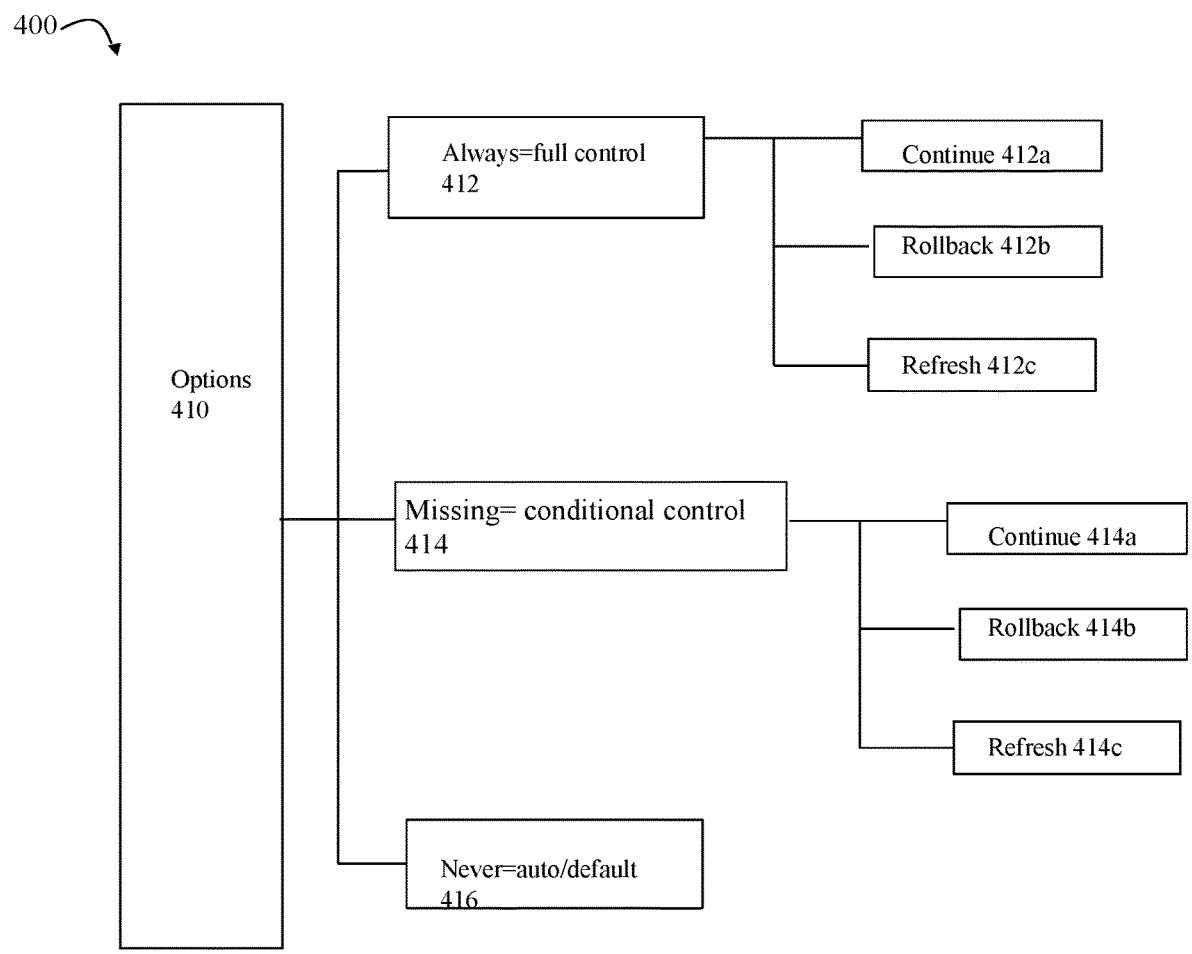

Consistent with discussion above, an embodiment may also provide different levels of control for configuring automation of the options in an embodiment in accordance with techniques herein. With reference to FIG. 7, shown is a representation 400 of the different options presented with the prompt to the administrator under specific conditions. Element 412 denotes the minimum level of automation/highest level of human interaction, element 414 denotes the second or middle level of automation, and element 416 denotes the maximum level of automation/minimum level of human interaction. Element 412 indicates that the administrator is prompted "always" to make a selection of continue 412*a*, rollback 412*b* or refresh/retry 412*c*. No action is automatically performed (unless the IOFWD timer has otherwise expired).

Element 414 indicates that if there are no inconsistencies in host initiator login information (e.g., all host initiators have re-logged into the first upgraders), then the upgrade processing automatically continues 414*a* without requiring further selection or interaction with the administrator. With element 414, the administrator is prompted to make a selection of continue 414*a*, rollback 414*b* or refresh 414*c* if there are inconsistencies in the host initiator login information. Otherwise, the upgrade processing continues automatically without further confirmation or interaction with the administrator.

Element 416 is a mode of total automation of the upgrade processing whereby there are no administrator prompts provided and a default action is automatically taken responsive to the state (e.g., consistency or inconsistency) of the host initiator login information.

Referring to FIGS. 8 and 9, shown is a table of information describing the different automation settings denoted by 412, 414 and 416 that may be included in an embodiment in accordance with techniques herein.

The examples 500 and 550, respectively, of FIGS. 8 and 9 include a table with an argument 502, description 504 and prompts and actions 506. The table includes rows 510, 512 and 552 corresponding to the automation settings 412, 414 and 416, respectively. For each row, the value of argument 502 may denote the particular automation setting selected and the description 504 and prompts and actions 506 for the particular selected automation setting. Thus, row 510 further describes processing performed when the automation setting is "always" (412) whereby there is no automation and the administrator has full control for selecting an action. Row 512 further describes processing performed when the automation setting is "missing" or "missing logins" (414). Row 514 further describes processing performed when the automation setting is "never" whereby there is no administrative prompt.

As indicated by the description 504 of row 510 for the setting of always 412, after an initial wait period, such as 6 minutes as described elsewhere herein, the status of host initiator logins may be checked and the details may be displayed to the administrator. The administrator may be prompted with the options at this point. The administrator may continue to type refresh/retry as needed, before the I/O forwarding phase times out (before IOFWD timer/time period expires). Selecting the always 412 automation setting may be desirable, for example, in systems with hosts that require manual or user operations. For example, such operation may include hosts that require manual scanning for the paths to be visible, and/or manual assistance from the customer to verify that initiator paths on the hosts are alive. If a path is unavailable, the administrator may attempt to resolve the issue within the timeout period specified in order to proceed with the upgrade.

As indicated by prompts and actions 506 of row 510 for the setting of always, a selection of continue causes the upgrade processing to continue (e.g., continue with step 228) even when there are missing host initiator logins. The prompt may also indicate, for example, that such missing logins may cause data unavailability conditions for one or more hosts. As indicated by prompts and actions 506 of row 510 for the setting of always, a selection of rollback causes the upgrade to abort and rolls back the nodes to using the V1 software for servicing I/Os. The customer may, for example, check the host resolve any issues/error conditions/inconsistencies, and then restart the NDU processing. As indicated by prompts and actions 506 of row 510 for the setting of always, a selection of refresh/retry causes a re-assessment of the host initiator login state whereby the current instance of host initiator login information is obtained and compared to the initial instance (e.g., such as obtained in step 201). If there are no inconsistencies whereby all host initiators have re-logged in, the prompted options of continue, rollback and refresh/retry may be presented to the administrator for selection in order to proceed.

As indicated by the description 504 of row 512 for the setting of missing logins 414, after an initial wait period such as 6 minutes, the status of the host initiator logins are checked. If all the initiator re-logins are detected (no inconsistencies), the NDU continues automatically (without displaying any prompt). If there are missing host initiator logins, they are displayed, and the administrator may be prompted with the options from which to select. As with row 510, the administrator may continue to type refresh/retry as needed, before the I/O forwarding phase (IOFWD timer) timeout expires. The setting of missing logins 414 may be selected, for example, when assistance from the customer may be required to determine whether any missing initiators are from critical hosts. If paths are unavailable from critical hosts, the customer may resolve the issue before continuing with the NDU.

As indicated by prompts and actions 506 of row 512 for the setting of missing logins 414 a selection of continue causes the upgrade processing to continue (e.g., continue with step 228) even when there are missing host initiator logins. The prompt may also indicate, for example, that such missing logins may cause data unavailability conditions for one or more hosts. As indicated by prompts and actions 506 of row 512 for the setting of always, a selection of rollback causes the upgrade to abort and rolls back the nodes to using the V1 software for servicing I/Os. The customer may, for example, check the host resolve any issues (e.g., error conditions/inconsistencies), and then restart the NDU processing. As indicated by prompts and actions 506 of row 512 for the setting of always, a selection of refresh/retry causes a re-assessment of the host initiator login state whereby the current instance of host initiator login information is obtained and compared to the initial instance (e.g., such as obtained in step 201). If (within the IOFWD expiration time period) there are no inconsistencies whereby all host initiators have re-logged in, the NDU automatically continues without displaying any prompt.

As indicated by the description 504 of row 552 for the setting of never 416, no interaction is required in connection with deciding an action to be taken based on the state of the host initiator logins. Processing waits for all the host initiators to log back in within the specified timeout period, IOFWD timer/timeout. The customer is expected to resolve any issues in connection with detected inconsistencies with host initiator login information within this timeout period. If after the timeout period there are missing host initiator logins (e.g., inconsistencies in host initiator login information), rollback processing is performed whereby the upgrade is aborted and nodes are rolled back to using and servicing I/Os using the V1 software.

As indicated by prompts and actions 506 of row 5552 for the setting of never 416, this setting does not result in presenting the administrator with any selection prompts. After an initial wait period of, for example, 6 minutes, the host initiator logins are checked. If all initiator logins are detected (e.g. no inconsistencies), the NDU continues automatically (without displaying any prompt). If there are missing initiator logins, the status of host initiator logins may be repeatedly checked, for example, every 10 seconds automatically, until the I/O forwarding phase (IO FWD timer) times out. If the I/O forwarding phase (IO FWD timer) times out, roll back processing is automatically performed (e.g., without displaying any prompt). If (within the IOFWD expiration time period) there are no inconsistencies whereby all host initiators have re-logged in, the NDU automatically continues without displaying any prompt.

In at least one embodiment, the default IO forwarding phase timeout (IOFWD timer, timeout or time period) is 180 minutes. It is important to check whether this value must be modified according to the environment requirements of the customers and weighed against the risks.

In connection with the foregoing in at least one embodiment in accordance with techniques herein, I/O forwarding is performed. Consistent with discussion elsewhere herein I/O forwarding is a mechanism in which I/Os are forwarded from one first director, such as a node, to another second director, such as another node, for processing. It is the second director which read/writes to the back end and returns back an acknowledgement of the I/O to the first director. During NDU, first upgraders ('A' directors) have been upgraded with the new software version and its Front End (FE) ports are open. Hosts may detect that first upgraders are back online and start the IO before second upgraders ('B' directors) are brought down. This precise situation when first upgraders are on the new version V2 of software and second upgraders are running the old V1 software gives the appearance that the first upgraders are servicing the host I/Os, but internally, the first upgraders are forwarding the I/Os to the second upgraders.

During NDU processing as described herein when I/O forwarding is in effect, the expectation is that all host initiators which have connectivity to the first upgraders login to the FE ports, as prior to the NDU, so that when the second upgraders are brought down, host I/O continues to be serviced by the first upgraders without causing any data unavailability. The I/O forwarding state may be in effect or present for a defined time period, such as 6 minutes, and the expectation is that all hosts login to the first upgraders within the 6 minute window. As this may not happen within the default timeframe during all NDU events, the NDU techniques as described herein have been modified, for example, to provide more control.

In at least one embodiment, the NDU processing may include an option to extend or modify the I/O forwarding phase (e.g., configure the IOFWD timer/timeout), and settings to determine whether an administrator is prompted (e.g., during the I/O forwarding phase), before proceeding further with the NDU. For the successful completion of the NDU, the availability of a customer during the NDU processing may be a factor in selecting one of the automation settings such as described herein (e.g., in connection with FIGS. 7, 8 and 9). Depending on the availability of the customer during the NDU, one of the settings 412, 414 and 416 may be selected along with an appropriate value for the IOFWD timer/timeout.

During NDU processing as performed in an embodiment in accordance with techniques herein, the first set of directors or first upgraders are booted using the new V2 software, and when the first upgraders come back up (running the new V2 software), the host initiators are expected to log back into them. As the initiators log back in, the I/Os serviced by the first upgraders are forwarded to the second upgraders for processing. This is referred to herein as the I/O forwarding phase, and the IOFWD timer/timeout option allows the user to control the duration of this phase. In at least one embodiment, the IOFWD timer/timeout may have a default value of 180 minutes, and may be modified to a minimum of 6 minutes and a maximum of 12 hours. It should be noted that larger values for the IOFWD timer/timeout option may be needed for configurations with hosts having special circumstances that require more time to log back in to the first upgraders before the second upgraders are taken down/offline for upgrade (e.g., manual scanning), or some customers may want to verify that all paths are active on their critical hosts before proceeding. These circumstances may warrant the use of an extended I/O forwarding phase and thus a larger value setting for the IOFWD timer/timeout. It may be recommended, however, to use the shortest timeout value for the IOFWD timer/timeout possible.

At least one embodiment in accordance with techniques herein may have recommendation usage regarding the different automation level selected or enabled. A first recommendation is to gauge the customer environment and decide on the criticality of the applications running on the host. If critical applications are running and administrators of the host are available to assist during NDU, the always=full control 412 level may be selected. For other use cases, the missing=condition control 414 level may be selected whereby the "refresh/retry" option may be used to obtain the current state of the host initiator login information before deciding whether to continue or rollback the NDU.

In accordance with techniques herein, an embodiment may minimize and even eliminate the chances of a data unavailability condition during the software upgrade of a storage appliance using host login information. Techniques herein provide the capability to decide a course of responsive action taken in connection with the software upgrade. Additionally, techniques herein provide time to correct any problems in connection the hosts or SAN issues to avoid data unavailability situations. Thus, techniques herein provide flexible options to the end-user/administrator to verify host initiator logins during the upgrade procedure, thereby having a fine grain of control over the software upgrade procedure while avoiding or minimizing conditions for data unavailability with respect to the hosts.

An embodiment in accordance with techniques herein may also provide for interaction and communication between the hosts and the appliance in connection with performing the NDU processing. For example, the appliance may interact with the hosts during the NDU processing if missing host initiator logins (e.g., inconsistencies in the re-logins) are detected. For example, agents may be installed on the hosts which may perform operations, such as rescanning for down or restarted nodes and thereby initiate host initiator re-logins to such nodes to correct the situation of missing host initiator logins during the NDU process.

An embodiment may implement the techniques herein using code executed by a processor. For example, an embodiment may implement the techniques herein using code which is executed by one or more processors of the data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing a non-disruptive upgrade of nodes of a storage appliance, the nodes including a first portion of the nodes and a second portion of the nodes, the method comprising:
    recording an initial set of host initiator login information identifying which of a plurality of host initiators are logged into which nodes of the storage appliance prior to performing the non-disruptive upgrade to upgrade the nodes from a current software version to a target software version;
    installing the target software version on the first portion of the nodes of the storage appliance;
    restarting the first portion of the nodes of the storage appliance running the target software version while also running the current software version on the second portion of the nodes of the storage appliance, wherein the non-disruptive upgrade is performed to upgrade the nodes of the storage appliance from the current software version to the target software version;
    subsequent to installing the target software version and said restarting, while the first portion of the nodes of the storage appliance are running the target software version and while the second portion of the nodes are running the current software version, performing I/O (input/output) operation forwarding so that I/O operations from the plurality of host initiators are serviced using the second portion of the nodes and not serviced using the first portion of the nodes, wherein, during said I/O operation forwarding, one or more of the plurality of host initiators are logged into at least one node of the first portion of the nodes and at least one node of the second portion of the nodes, and wherein said I/O operation forwarding includes the first portion of the nodes that receives the I/O operations internally forwarding the I/O operations within the storage appliance from the first portion of the nodes to the second portion of the nodes for servicing by the second portion of the nodes using the current software version, and wherein the I/O operations are serviced using the current software version running on the second portion of the nodes;
    recording a second set of the host initiator login information while performing the I/O operation forwarding, said second set of the host initiator login information identifying which of the plurality of host initiators have re-logged into which nodes of the first portion;
    comparing the initial set and the second set to determine whether there are any inconsistencies between the initial set and the second set; and
    determining, in accordance with the host initiator login information and while said I/O operation forwarding is performed that internally forwards the I/O operations, whether to continue with the non-disruptive upgrade of the nodes by upgrading the second portion of the nodes to the target software version.

2. The method of claim 1, wherein the host initiator login information includes the initial set and the second set, and said comparing determines that there are no inconsistencies between the initial set and second set if there are no differences between the initial set and the second set.

3. The method of claim 2, further comprising:
    responsive to determining that there are no inconsistencies between the initial set and second set, said determining determines to continue with the non-disruptive upgrade by upgrading the second portion of the nodes to the target software version.

4. The method of claim 3, further comprising:
    responsive to determining, in accordance with the host initiator login information, to continue with the non-disruptive upgrade of the nodes by upgrading the second portion of the nodes to the target software version, performing remaining upgrade processing including:
    performing an I/O operation transfer from the second portion of the nodes to the first portion of the nodes, wherein the first portion of the nodes are running the target software version and servicing host I/O operations, and wherein the second portion of the nodes running the current software version stop servicing the host I/O operations;
    restarting the second portion of the nodes running the target software version; and
    subsequent to restarting the second portion of the nodes, servicing the host I/O operations using the first portion of the nodes running the target software version and the second portion of the nodes running the target software version.

5. The method of claim 2, further comprising:
    while said I/O operation forwarding is in effect, waiting an initial amount of time for the plurality of host initiators to re-log into the first portion of the nodes; and
    subsequent to said initial amount of time elapsing, starting an I/O forward timer denoting a timeout period.

6. The method of claim 5, wherein said determining, in accordance with the host initiator login information, whether to continue with the non-disruptive upgrade of the nodes by upgrading the second portion of the nodes to the target software version further includes:
    determining whether there are any inconsistencies between the initial set and the second set; and
    determining, in accordance with an automation setting and in accordance with whether there are any detected inconsistencies between the initial set and the second set, whether to automatically continue with the non-disruptive upgrade of the nodes bar upgrading the second portion of the nodes to the target software version.

7. The method of claim 6, wherein the automation setting is one of a plurality of settings including:
    a first setting that always requests confirmation to proceed with a first selected action;
    a second setting that automatically continues with the non-disruptive upgrade if there are no inconsistencies between the initial set and the second set, and otherwise, if there are inconsistencies determined between the initial set and the second set, requests confirmation to proceed with a second selected action; and a third setting that automatically continues with the non-disruptive upgrade if there are no inconsistencies between the initial set and the second set, and otherwise, if there are inconsistencies determined between the initial set and the second set after the timeout period has elapsed, automatically aborting the non-disruptive upgrade and rolling back the first portion of the nodes to run the current version of the software for servicing I/O operations.

8. The method of claim 7, wherein each of the first selected action and the second selected action is any of an action to continue with the non-disruptive upgrade, an action to rollback the non-disruptive upgrade by rolling back the first portion of the nodes to run the current version of the software for servicing I/O operations, and an action to perform refresh processing to obtain a revised set of the host initiator login information for repeated comparison to the initial set to detect any inconsistencies therebetween.

9. The method of claim 8, wherein upon determining inconsistencies between the initial set and the second set and wherein the automation setting is any of the first setting and the second setting, and wherein the method further includes:

displaying a list of host initiator logins that are included in the initial set and missing from the second set, wherein the list denotes the inconsistencies determined between the initial set and the second set.

10. The method of claim 1, wherein the storage appliance provides virtualized storage to one or more hosts including the plurality of host initiators, wherein the storage appliance virtualizes storage of a plurality of data storage systems.

11. The method of claim 10, further comprising:

establishing connectivity between the plurality of host initiators of the hosts and the nodes of the storage appliance, and wherein the plurality of host initiators are configured, prior to performing the non-disruptive upgrade, to issue I/O operations over a plurality of paths to the nodes of the storage appliance.

12. The method of claim 1, wherein the target software version is installed irrespective of a connectivity between the nodes and a plurality of host initiators and on only the first portion of the nodes.

13. A system comprising:

one or more processors; and a memory comprising code stored thereon that, when executed, performs a method of performing a non-disruptive upgrade of nodes of a storage appliance, the nodes including a first portion of the nodes and a second portion of the nodes, the method comprising:

recording an initial set of host initiator login information identifying which of a plurality of host initiators are logged into which nodes of the storage appliance prior to performing the non-disruptive upgrade to upgrade the nodes from a current software version to a target software version;

installing the target software version on the first portion of the nodes of the storage appliance;

restarting the first portion of the nodes of the storage appliance running the target software version while also running the current software version on the second portion of the nodes of the storage appliance, wherein the non-disruptive upgrade is performed to upgrade the nodes of the storage appliance from the current software version to the target software version;

subsequent to installing the target software version and said restarting, while the first portion of the nodes of the storage appliance are running the target software version and while the second portion of the nodes are running the current software version, performing I/O (input/output) operation forwarding so that I/O operations from the plurality of host initiators are serviced using the second portion of the nodes and not serviced using the first portion of the nodes, wherein, during said I/O operation, forwarding one or more of the plurality of host initiators are logged into at least one node of the first portion of the nodes and at least one node of the second portion of the nodes, and wherein said I/O operation forwarding includes the first portion of the nodes that receives the I/O internally forwarding the I/O operations within the storage appliance from the first portion of the nodes to the second portion of the nodes for servicing by the second portion of the nodes using the current software version, and wherein the I/O operations are serviced using the current software version running on the second portion of the nodes;

recording a second set of the host initiator login information while performing the I/O operation forwarding, said second set of the host initiator login information identifying which of the plurality of host initiators have re-logged into which nodes of the first portion;

comparing the initial set and the second set to determine whether there are any inconsistencies between the initial set and the second set; and determining, in accordance with the host initiator login information and while said I/O operation forwarding is performed that internally forwards the I/O operations, whether to continue with the non-disruptive upgrade of the nodes by upgrading the second portion of the nodes to the target software version.

14. A non-transitory computer readable medium comprising code stored thereon that, when executed, performs a method of a non-disruptive upgrade of nodes of a storage appliance, the nodes including a first portion of the nodes and a second portion of the nodes, the method comprising:

recording an initial set of host initiator login information identifying which of a plurality of host initiators are logged into which nodes of the storage appliance prior to performing the non-disruptive upgrade to upgrade the nodes from a current software version to a target software version;

installing the target software version on first portion of the nodes of the storage appliance;

restarting the first portion of the nodes of the storage appliance running the target software version while also running the current software version on the second portion of the nodes of the storage appliance, wherein the non-disruptive upgrade is performed to upgrade the nodes of the storage appliance from the current software version to the target software version;

subsequent to installing the target software version and said restarting, while the first portion of the nodes of the storage appliance are running the target software version and while the second portion of the nodes are running the current software version, performing I/O (input/output) operation forwarding so that I/O operations from the plurality of host initiators are serviced using the second portion of the nodes and not serviced using the first portion of the nodes, wherein, during said I/O operation forwarding, one or more of the plurality of host initiators are logged into at least one node of the first portion of the nodes and at least one node of the second portion of the nodes, and wherein said I/O operation forwarding includes the first portion of the nodes that receives the I/O operations internally forwarding the I/O operations within the storage appliance from the first portion of the nodes to the second portion of the nodes for servicing by the second portion of the nodes using the current software version, and wherein the I/O operations are serviced using the current software version running on the second portion of the nodes;

recording a second set of the host initiator login information while performing the I/O operation forwarding, said second set of the host initiator login information identifying which of the plurality of host initiators have re-logged into which nodes of the first portion;

comparing the initial set and the second set to determine whether there are any inconsistencies between the initial set and the second set; and determining, in accordance with the host initiator login information and while said I/O operation forwarding is performed that internally forwards the I/O, whether to continue with the non-disruptive upgrade of the nodes by upgrading the second portion of the nodes to the target software version.

15. The non-transitory computer readable medium of claim 14, wherein the host initiator login information includes the initial set and the second set, and said comparing determines that there are no inconsistencies between the initial set and second set if there are no differences between the initial set and the second set.

16. The non-transitory computer readable medium of claim 15, wherein the method further comprises:
responsive to determining that there are no inconsistencies between the initial set and second set, said determining determines to continue with the non-disruptive upgrade of the nodes by upgrading the second portion of the nodes to the target software version.

17. The non-transitory computer readable medium of claim 16, wherein the method further comprises:
responsive to determining, in accordance with the host initiator login information, to continue with the non-disruptive upgrade of the nodes by upgrading the second portion of the nodes to the target software version, performing remaining upgrade processing including:
performing an I/O operation transfer from the second portion of the nodes to the first portion of the nodes, wherein the first portion of the nodes are running the target software version and servicing host I/O operations, and wherein the second portion of the nodes running the current software version stop servicing the host I/O operations;
restarting the second portion of the nodes running the target software version; and
subsequent to restarting the second portion of the nodes, servicing the host I/O operations using the first portion of the nodes running the target software version and the second portion of the nodes running the target software version.

18. The non-transitory computer readable medium of claim 14, wherein the target software version is installed irrespective of a connectivity between the nodes and a plurality of host initiators and only on the first portion of the nodes.

* * * * *